United States Patent [19]

Schwalba et al.

[11] Patent Number: 5,677,700
[45] Date of Patent: Oct. 14, 1997

[54] APPARATUS AND METHOD FOR ACHIEVING OPTICAL DATA PROTECTION AND INTIMACY FOR USERS OF COMPUTER TERMINALS

[76] Inventors: Henrik Schwalba, Suederstr. 325, Hamburg, Germany, 20537; Henry Rudolph, Suedstr. 1, Holleben, Germany, 06179

[21] Appl. No.: 362,272

[22] Filed: Dec. 22, 1994

[30] Foreign Application Priority Data

Dec. 23, 1993 [DE] Germany ............... 43 44 050.9

[51] Int. Cl.⁶ .................. G09G 3/02; H04N 1/00
[52] U.S. Cl. ............ 345/7; 345/8; 345/9; 345/173; 345/175; 359/630; 348/53
[58] Field of Search ............... 345/8, 9, 173, 345/175, 174, 7; 353/28; 359/17, 618, 629, 630, 18; 348/53, 156, 161; 178/18; 382/48, 131, 154; D16/225

[56] References Cited

U.S. PATENT DOCUMENTS

| | | | |
|---|---|---|---|
| 4,843,568 | 6/1989 | Krueger | 382/100 |
| 5,146,049 | 9/1992 | Shima | 345/173 |
| 5,168,531 | 12/1992 | Sigel | 382/48 |
| 5,231,381 | 7/1993 | Duwaer | 178/18 X |
| 5,305,017 | 4/1994 | Gerpheide | 345/174 |
| 5,369,228 | 11/1994 | Faust | 178/18 |
| 5,376,947 | 12/1994 | Kuroda | 345/173 |
| 5,446,480 | 8/1995 | Yoshida | 345/174 X |
| 5,483,261 | 1/1996 | Yasutake | 345/173 |
| 5,491,510 | 2/1996 | Gove | 345/8 X |

FOREIGN PATENT DOCUMENTS 0 554 492  8/1993  European Pat. Off. .

OTHER PUBLICATIONS

H.S. Hoffman, Jr., Exact Position Detection with Finger Point and Feedback. IBM Tech Disclosure Bulletin, vol. 23, No. 6.
JP-A-59-132 079 (Abstract).
JP-A-2 132 510 (Abstract).
JP-A-63-167923 (Abstract).

*Primary Examiner*—Raymond J. Bayerl
*Assistant Examiner*—Seth D. Vail
*Attorney, Agent, or Firm*—Townsend and Townsend and Crew LLP

[57] ABSTRACT

Apparatus and method for achieving optical data protection and intimacy for users of computer terminals. The apparatus includes a searcher screen positioned in front of an optical system and adjustable to the user which communicates in a binocular manner with the user. A tactile contact surface with a sensor grid or raster arranged underneath is present below the searcher screen. A video camera is installed over the tactile contact surface, wherein finger movements of the user taking place on the tactile contact surface are copied by means of the video camera into a virtual image positioned on the searcher screen. The fingers, which are controlled by the user himself, are guided to particular positions of the virtual image, wherein given positions in a virtual image correspond to those on the tactile contact surface where the fingers are currently positioned, and the data input takes place via an associated sensor grid or raster by touching this position of the tactile contact surface.

9 Claims, 3 Drawing Sheets

APPARATUS AND METHOD FOR ACHIEVING OPTICAL DATA PROTECTION AND INTIMACY FOR USERS OF COMPUTER TERMINALS

BACKGROUND OF THE INVENTION

1. Technical Field

The invention relates to an apparatus and method for achieving optical data protection and intimacy for users of computer terminals implemented as an interaction process for the input and output of data at computer terminals, in particular for use in service terminals in public places.

2. Description of the Prior Art

Service terminals in public places are, for example, information terminals, ticket terminals for air travel, cash dispensers, as well as other terminals in the field of banking. The number of public service terminals has increased strongly in previous years. It is to be expected that this trend will continue since, in the service industries in question, the installation of an extensive service network can typically be achieved with fewer resources than is possible for services provided by service personnel. Moreover, service terminals can be used 24 hours a day without difficulty. This development is encouraged further by the falling world market prices for high power computer technology. At the present time, service terminals in the field of banking for use as cash dispensers are the most widespread. As a result of the relatively low complexity of the services offered, these terminals typically come with a smallish screen, a numeric keyboard, eight selection keys (for sums of money of 50 to 1,000 Dollars, Marks, etc., as well as an extra key for selecting other sums) and function keys such as CONFIRM, CORRECT, and ABORT. Despite their high user acceptance, based substantially on their extensive presence and their availability at all times of day, these dispensers possess certain peripheral as well as certain very serious deficiencies.

The numeric keyboard or keypad part is a fixed hardware solution and is different for different dispensers using the American and the European key positions. This hinders the development of user habits or customs in the operation. User habits are, however, very important since they give the user a feeling of security during the operation.

The graphic indication of the direction and orientation with which the cash card has to be fed in is often misunderstood by the user. Since cash dispensers also differ from one another in this operating step, it can often be observed that users have to feed in their card many times. For many users this is very unpleasant, due in large part to the fact it happens in public.

The cathode ray tubes employed by many typical service terminals have a relatively low brightness. Despite sometimes complex screening of bright light, on some occasions when the environment is very bright, for example during sunshine, the contents of the screen are scarcely readable or no longer readable at all. This situation may not occur very often because it depends on the location of the dispenser. However, when it does occur it is very disadvantageous for the user.

One serious disadvantage of all cash dispensers is that the security of the user during input of his secret code (pin number) is inadequate. The four-digit code, which is the only security criterion of the cash card, can be very easily discovered by fraudsters. At many cash dispensers, the target person of the fraud only needs to be observed from the right perspective by the fraudster during the keying in. Since the input of a secret code is also required for terminals relating to other services, it appears to be indispensable to develop a secure solution.

The second great disadvantage is the absence of intimacy for the user during operation. In many cases, the customer at the cash dispenser is effectively in a goldfish bowl. Every person standing around who really wants to know can see from the screen or from the key input whether only 50 Dollars, Marks, etc. or 1,000 Dollars, Marks, etc. are about to be withdrawn. This practically invites the fraudster to commit a crime.

The absence of intimacy has still a further disadvantage. It is characteristic of service terminals that they stand in public places and are operated in public. The user is often observed during operation by other persons or feels that he is being observed because his operation and its results can be seen by other people. Moreover, every incorrect operation becomes a kind of public failure. This can further increase threshold fears already existing in many people against the use of new kinds of terminals.

Screened-off areas in public terminals have been installed in increasing numbers in recent times due to the lack of privacy. Unfortunately, it is often characteristic of the solutions that, in spite of them, much is still seen by strangers since these screened-off areas would have to lead to a kind of interaction box for them to be truly effective. This, however, contradicts the character of public terminals and would be directly counterproductive to their acceptance.

An alternative is optical grids or rasters located directly in front of the monitor or screen. The operating movements of the user are still visible but the contents of the screen can only be recognized from a particular angular range of view. This solution has, however, not managed to lead to terminals installed in public places for which the user is really the only person who can view the contents of the screen. Only if this were the case would the user be really safe.

As mentioned, there are already information and service terminals outside the area of banking. Applications are, for example, booking and ticket sales for air travel, town information, and maps for shopping centers. The operation processes characteristic of most cash dispensers with hardware-fixed selection keys are not suitable for such terminals because the range of their services is generally considerably more complex and sophisticated than could be operated with a few selection keys for a relatively small number of options.

The solutions in this area are predominantly touchscreens. Combinations of screen and trackball or handwheel also sometimes occur. An important advantage of this solution is that the user is no longer required to continuously change his view between screen and peripheral keys.

The touchscreen has an important advantage relative to other interaction processes. The user can input the desired option directly by touching the screen, since the optical and the haptical operating surfaces are merged into one. Succinctly expressed, the user simply touches what he wants to have. He has already learned this as a child. Consequently, there is no danger of any user having coordination difficulties during operation or of only qualifying for operation after a long learning process. This is not the case for input by means of trackball or handwheel. These processes and the coordination required have first to be learned by users who are not used to computers. They are therefore less suitable for wide acceptance by the public. Moreover, their mode of operation is not as direct as for a touchscreen. As a result, the touchscreen appears to be the best interaction medium for public terminals since the mode of operation of touchscreens is matched to abilities which almost all people already possess.

Despite these advantages, the touchscreen interaction also has deficiencies. These deficiencies are evidenced by the still relatively low acceptance of touchscreens by the public.

A deficiency of this kind is ergonomical in nature. The optimum optical viewing angle of a person standing up requires substantially vertical screens, with the optimum viewing angle lying at approximately 15 degrees below horizontal. On the other hand, an approximately horizontal contact area is optimum for touch operations (ca. 15 degrees above horizontal—approximately at hip height). However, with the touchscreen, the contact and viewing surfaces are merged into one. There are essentially three existing solutions to this problem.

There are screens which are almost vertical and lie at eye height. For these, the user during a prolonged interaction must lift his hand up to the screen repeatedly from the hanging position or hold his hand in an elevated position the whole time. Furthermore, the enormous difference in body sizes from the 5% female to the 95% male dictates against this solution. This difference amounts to approximately 40 cm and represents a problem for the optimum positioning of a screen which has to be observed from close proximity.

Furthermore, there are screens which are mounted approximately at the height of lecterns with an approximately 15 degree inclination above horizontal. For these, the user must hold his head bowed down during the entire duration of the interaction. For tall users, a crouched posture can often be observed.

The favorable compromise solution is given by touchscreens installed at an angle of inclination of 45 degrees. However, this solution gives a maximum probability for reflections of incident sunlight or roof lights onto the screen and thus to the occurrence of dazzling reflections, which are to be avoided at all cost. Anti-reflection screen surfaces provide only unsatisfactory remedies as observations on existing terminals show. Furthermore, the formation of dazzling reflections on screens installed in public places is a general problem.

The haptic experience of touching onto a smooth, hard and often cold glass plate is unpleasant for many users or at least takes some getting used to. The fingerprints generated by the touching are often clearly visible and clearly mitigate against the acceptance of this interaction medium.

From the above, it can be concluded that for an interaction process for public service terminals, a solution has to be developed which encompasses the decisive advantage of the touchscreen, namely the direct communication of desired options, but which excludes the disadvantageous aspects of touchscreen. Of major importance for this solution is the achievement of optical data protection and intimacy for the user.

An interaction process relevant for the present invention was developed by Hans E. Korth of IBM for subnotebooks and palmtops. This solution is given in the patent document EP 0554492 and is based on the prior art patent documents: JP-A-59132079; JP-A-21032510; JP-A-63167923; and U.S. Pat. No. 4,843,568.

For these processes, hardware components for the computer data input are no longer required. The advantage of this development is thus that the diminution of size of computer hardware no longer needs to come to an end with the antropometrically relevant input devices, such as the keyboard, which one cannot sensibly reduce in size. This is so because such input devices are no longer necessary for this process.

The signal input in this system is effected by the observation and analysis of the hand and finger movements by means of a TV sensor. A window on the screen simultaneously displays the template of a keyboard as well as a schematic image of the hands during the operative movements. The TV sensor monitors the operative movements with a three-stage algorithm. In the first stage, the contrast values of the hand are determined along a particular line. In the second stage, the contour of the hand is read in. In the third stage, the fingertips are observed. The system recognizes the differences of speed during the movement of the hand and the contact of fingertips on the table-top plate. It interprets the contact speed of the fingertips in combination with the location of the touching as the hitting of a particular key or input of a particular instruction. For this, the user has to physically hit the table place of his writing table with his fingertips. A gentle touching is insufficient for the system to register a touching event. This system relates to a method for the photoanalytic or optical input of data.

Computer users who are able to touch-type perfectly can thus input their instructions into the computer with the invisible keyboard. For inputting using hunt-and-peck, i.e. one finger, which is of major importance for public terminals, it is recommended that the user lay a foil with the key positions printed on it onto the writing table.

The disadvantage of this solution is that the person who uses this technology must change his typing habits. Moreover, he is compelled to keep to and get used to a particular key pattern or operating pattern. This can be highly disadvantageous for the acceptance of public terminals operating with a process of this kind.

In this solution a foil template with the keys printed on it as a key underlay is recommended for users who work with the hunt-and-peck or one-finger system. This compels them once again to change their view between screen and touch surface. Moreover, this becomes impossible when, as in touchscreens, the graphical contents of the picture change after each operation step.

After the analysis of the prior art, two features are of fundamental importance for the development of an interaction process for application in public terminals.

First: The terminal should be simple and reliable to operate, if possible, for all users, i.e. also for users without computer experience, which are still very large in number. It is thus required that the interaction process of the terminal be well-matched to capabilities and abilities which every relevant user already possesses. The operation therefore must not require any learning process of a coordination kind or of a kind relating to the arrangement of the inputs and the associated keys or the like. The very first operative process at the terminal must already be a problem-free success for the relevant user. Only in this way can the installed terminals achieve wide acceptance and thus economic efficiency. An interaction medium which in part has these features is the touchscreen.

Second: For the interaction process it is of unavoidable importance that it has the feature of intimacy for the user. For terminals created in public places, results or contents of an input instruction must be reliably protected from undesired observation by other people. From the two named input parameters, the logical consequence follows that the interaction process to be developed must incorporate the simple operability of the touchscreen but exclude its disadvantages which have led to its only partial acceptance. Additionally, it must have the feature of intimacy that is not inherent in the touchscreen.

The first partial solution required for fulfilling the described requirements is the search for the means of producing a picture perceivable only by the user.

SUMMARY OF THE INVENTION

The present invention addresses the shortcomings of the prior art.

The advantages of the invention are that, as a result of its specific configuration, the principle underlying the solution delivers perfect protection against undesired observation of input data by people other than the user himself. Strangers can only observe the touching movements on a touch surface devoid of information. In practical use this means, for example, the complete security of the user when inputting his cash card secret code into a public terminal. This has not existed up to now. The theoretical possibility of strangers recognizing and identifying specific keying-in or touch patterns can be completely excluded by a corresponding arrangement of the graphic operation surface. However, this scarcely plays a role even without this.

New, additional application opportunities are opened up for touchscreen interaction processes. The specific operating advantage for use in public terminals—consisting of the direct touching of the desired options on the screen—is achieved in that the optical and haptical operating surfaces are combined as a virtual image in front of the eyes of the person. The operation thus remains just as simple. Furthermore, the specific shortcomings of touchscreens in existing systems no longer exist. The user no longer needs to touch on a haptically poor glass plate; rather, he can touch a surface which reacts directly to his touching by the surface yielding to finger pressure up to a particular point and then biasing or springing back. The original and important feedback for key or touch operation is thus once again possible. Simultaneously, the problem of the fatty fingerprints of previous users characteristic of the touchscreen is substantially removed by a suitable choice of material. Moreover, the problem is less that of the fingerprints themselves, but rather the fact that the user sees them on the glass plate.

Through the use of the searcher screen, the two principal problems characteristic of screens installed in public places, namely the formation of dazzling reflections and the formation of low contrast screen displays as a result of excessive environmental brightness, are completely removed. The above-mentioned ergonomic problem of the different optimum action surfaces or axes for human eye and hand is removed by the opto-virtual combination of the touch and vision fields in front of the human eye. Also, the different user body sizes are no longer a problem because, as a result of the virtual picture image, a reduced dimensioning of the searcher screen is possible.

In the previously cited IBM invention, the person using the technology must change his typing habits. Moreover, he is compelled to comply with or get used to particular movement patterns or handling patterns. This can be highly disadvantageous for the acceptance of public terminals which operate according to a process of this kind. In the present invention, however, the technology matches itself to the person and not the reverse, since the person can carry out his touch or keying operations in a manner that suits him.

Moreover, as a result of the very high light sensitivity of modern video cameras, no special requirements need to be made regarding the environmental brightness or the material and color of the touch surface background.

In the IBM invention, a template with keys printed on it is recommended as a contact surface underlay for hunt-and-peck users. This compels users to change their view once more between screen and contact surface. Moreover, this becomes impossible when, as in the touchscreen, the graphical contents of the picture or image change after each operational step. With the present system, no aids of this kind are necessary for the user whatsoever.

The present system is not only able to recognize touch contacts as instructions, it can equally well be envisaged that script is transferred to the screen input with a pen on the touch surface and is evaluated as an instruction. This form of interaction will become increasingly important in the future. With the photoanalytical signal recognition system of the IBM invention, this is not possible.

The photorealistic transfer of the hand of the user to the screen is advantageous. The user can thus immediately identify the virtual hand which he sees on the screen as identical with his own hand and correspondingly also coordinate his movements in a normal and simple manner.

DETAILED DESCRIPTION OF THE PREFERRED EXEMPLARY EMBODIMENTS

Figure 1:
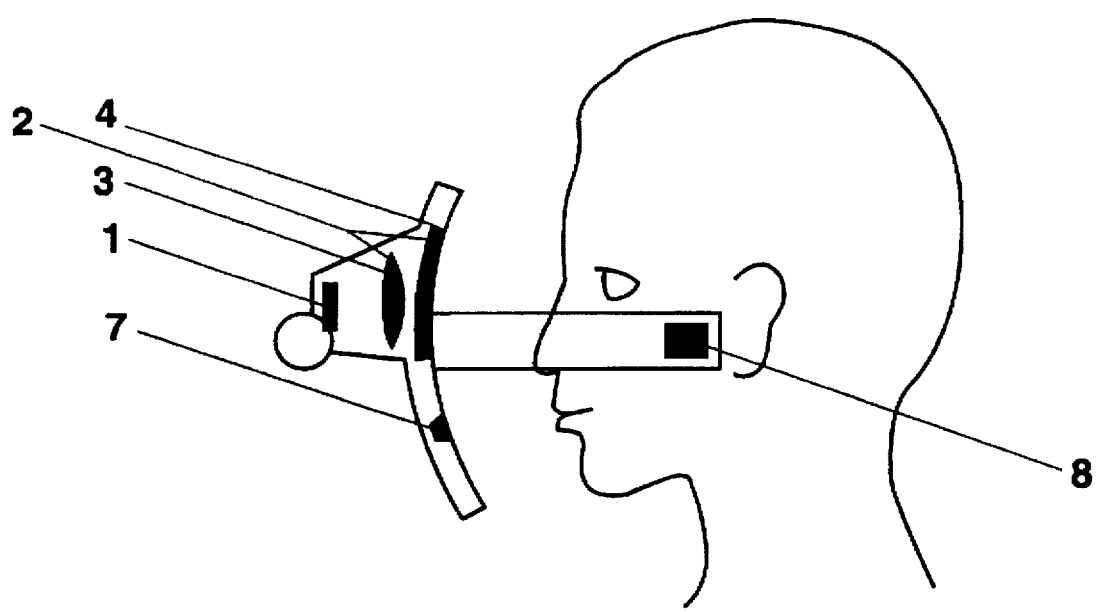
FIG. 1 is a schematic of a portion of apparatus in accordance with the present invention.
Figure 2:
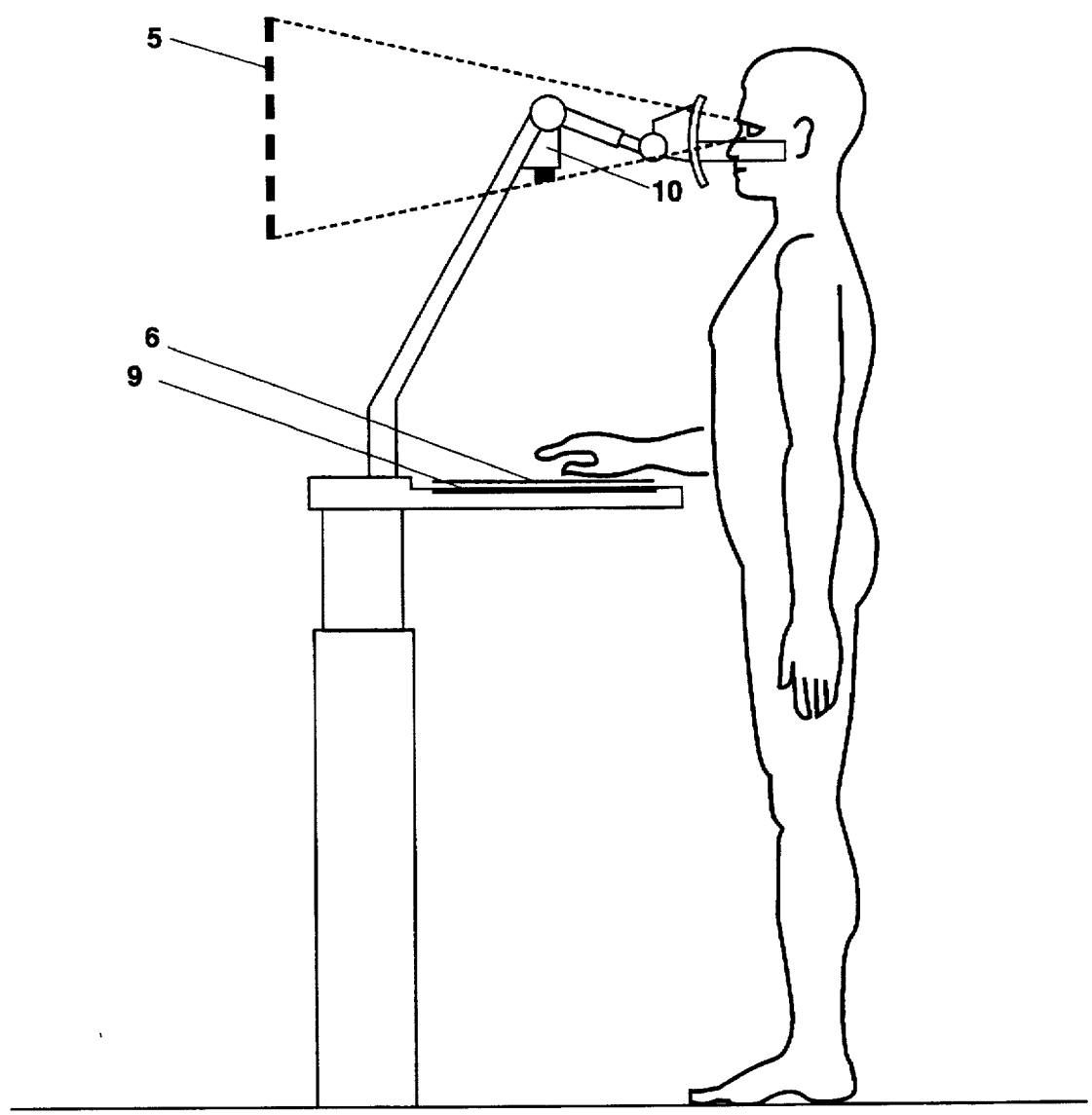
FIG. 2 is a schematic further illustrating apparatus in accordance with the present invention.

The apparatus shown in FIGS. 1 and 2 is characterized by a searcher screen 1 communicating in a binocular manner with the opto-visual sense channel of the user. The searcher screen 1 is of very small dimensions.

An optical system 2 is positioned in front of this searcher screen 1 and comprises one or a plurality of convex lenses 3.

In addition, the installation of a concavely curved contrast filter sheet 4 in front of the convex lenses 3 has proved to be advantageous. Simultaneously, the installation has the function of an optical grid or raster. When the user views the searcher screen 1 in close proximity he perceives optically a virtual image 5 located in the space behind the searcher screen 1. The user thus receives the same impression that he would if he were perceiving a conventional touchscreen operating surface positioned at the place where the virtual image 5 is located. The perceived touchscreen surface should have realistic dimensions which need to be determined taking into account the relative sizes of the hand of the user and the character or graphic sizes as well so as to provide an ergonomically suitable separation of the touch options to be actuated on a tactile contact surface or area 6.

The virtual image 5 and the small dimensions and specific arrangements of these components result in the contents of the screen being only perceivable by the person interacting at the terminal. The consequence is a perfect protection for the data entered at the screen from the glances of undesired observers or possible fraudsters.

Dazzling reflections on the screen of the concavely curved contrast filter sheet 4 are also removed. A basic law of optics for image formation on concave mirrors states that an object located outside the simple focal length near the axis of a concave mirror is enlarged and forms an inverted image from the hollow mirror. If the concavely curved contrast filter sheet 4 were a mirror and if dazzling reflections related to mirror reflections, the already small surface of the contrast filter sheet 4 would be completely covered by the enlarged image of the user's head. However, where an image of a surface is completely covered, no second object can be formed positioned at a larger distance from the image surface than the object of the image. It is precisely this relationship which is characteristic of the distance ratios of searcher screen 1, head of the user and possible sources of dazzling. Moreover, the head of the person delivers still additional shadow because the area of his face is larger than the surface of the convex lens or lenses 3 and because he is positioned in close proximity in front of the screen.

Moreover, the described configuration completely removes low contrast or unrecognizable screen information arising from excessive environmental brightness.

The functional principle of the searcher screen 1 can be designed monocular or binocular. A binocular design is, however, favorable since this is more compatible with the normal sight process of users and provides a low distraction and stress-free interaction.

A microphone 7 and a loudspeaker 8 are additionally installed at the searcher screen 1. Their arrangement can take into account the position of the mouth and ears on the human head with regard to product-semantic and use aspects. Through this, interaction via the acoustic sense channel is possible in addition to interaction via the opto-visual sense channel. This expands the power of the system as well as the comfort of the user since, through this, verbal interaction with service personnel or operators projected perhaps live onto the searcher screen 1, as well as the sending of acoustic feedback or multi-sense double coordination, is also possible.

Moreover, a multi-sense character of the interaction is possible where desired. This harmonizes with the interaction experiences of people gained from interpersonal interaction and can thereby have a positive effect on the acceptance of the service terminal.

As a result of the small dimensions of the searcher screen 1 as well as of the different body sizes of potential users, and in order to allow use by people in wheelchairs or other handicapped people, it is practical to install the searcher screen 1 so that it can be adjusted to different user head heights or can be adjusted by the users to different head heights.

The searcher screen in isolation does not yet provide the direct touching of desired options advantageous of touchscreens, since a virtual image cannot have a tactile contact surface or contact area. It is thus necessary to provide a possibility of contacting this virtual image, once again in a virtual way. This is achieved with two further interactively relevant hardware components.

Figure 3:
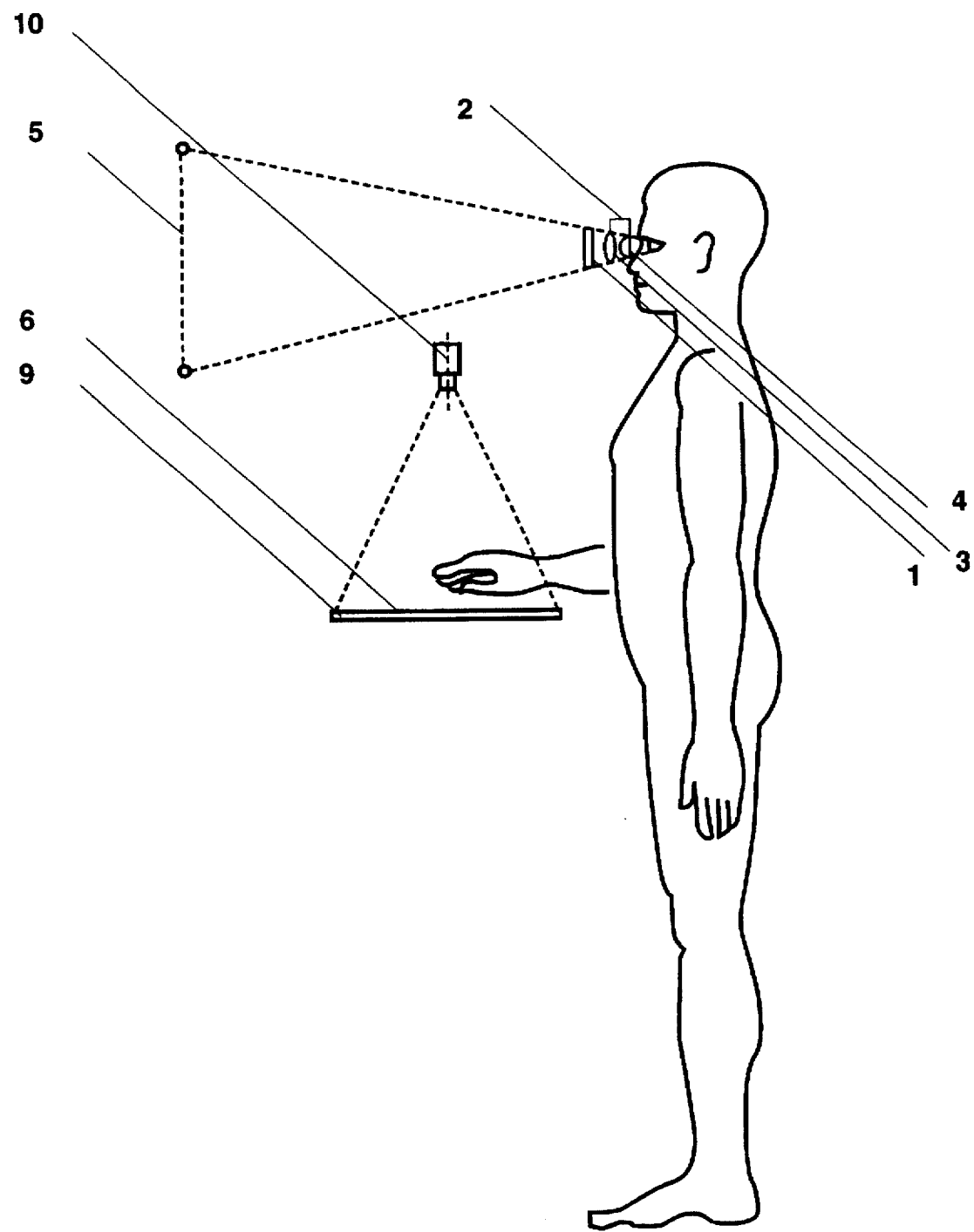
FIG. 3 is a schematic still further illustrating apparatus in accordance with the present invention.

As shown in FIGS. 2 and 3, the tactile contact surface 6 for the user comprises a sensor grid or raster 9. This can be installed horizontally under the searcher screen 1 at a convenient height. The dimensions of its surface should correspond to the dimensions of conventional touchscreens or the dimensions of the virtual image 5 perceived by the user on the searcher screen 1 already described.

As shown in FIG. 3, realistic and ergonomically favorable size ratios are achieved between the hand of the user and the tactile contact surface 6 which match the coordination of the touch movements of the user. The sensor grid or raster 9 can be hidden under a homogeneous haptically high quality tactile contact surface 6 which yields on gentle contact pressure of the user up to a particular constantly defined stop point. This is favorable because, with it, the tactile feedback which the user is used to is given, i.e. that which the user experiences when he actuates a key and this key yields up to a particular point to his pressure and subsequently presses back once again. This is also a decisive advantage over the touchscreen in which a feedback of this kind is not possible as a result of the glass plate and must instead be simulated by indirect acoustic or graphical means. Many potential users need to get used to this. Moreover, the materials quality of the tactile contact surface 6 can be so designed that the formation of user fingerprints characteristic of touchscreens can be substantially avoided.

The functional arrangements of the sensors of the sensor grid or raster 9 or of the tactile contact surface 6 thereby correspond directly to the virtual contact fields of the relevant virtual image currently being displayed on the searcher screen 1—the virtual contact field corresponding to the individual options. Consequently, each particular virtual contact field of the virtual image 5 displayed in the searcher screen 1 has identical coordinates x, y, or at least identical coordinate ratios within the virtual image 5 and the associated sensor field or associated sensor within the entire tactile contact surface 6 of the service terminal. When, after actuating an option, the user is displayed a new virtual image 5 at the searcher screen 1, the functional arrangements associated with this new image of the sensor field to be touched for the option selection are simultaneously formed on the tactile contact surface 6.

The signal input into the system is thus performed by the user by means of touch contact of sensor fields or of individual sensors.

The third component relevant for the interaction makes possible the coordination of the user's hand or finger movements within the tactile contact surface 6 as well as the virtual contact of desired options displayed on the virtual image 5 of the searcher screen 1.

This object is satisfied by a video camera 10 in accordance with FIG. 3 installed over the tactile contact surface 6. The video camera 10 transmits the image of the hand of the user as well as its movements into the virtual image 5 of the searcher screen 1. This takes place by the video camera 10 recording the hand and its movements and simultaneously copying these movements of the user's hand and fingers into the virtual image 5 of the searcher screen 1. The tactile contact surface 6, which is in reality located under the hand, is not transferred with the other information into the virtual image 5. The user therefore perceives a virtual image 5 of the screen display as he looks into the searcher screen 1 via which he can virtually recognize the upper side of his own hand as it is performing the touching process.

The consequence is that a virtual image 5 is located in front of the eyes of the person interacting at the service terminal, and the contents of this virtual image correspond to that which he would see if he were carrying out his touching actions at a conventional touchscreen. The coordination of movement of the touching contacts is just as simple and reliable for the user as for a conventional touchscreen. The user can coordinate his touch movements, i.e. touch distances and touch directions, on the horizontally arranged tactile contact surface 6 without difficulty because he receives these movements as well as the significance of the contact fields simultaneously as he looks into the searcher screen 1 located in front of his eyes. The separation of the touch field and the field of view, which exist in reality but which are combined in an opto-virtual manner in front of the eyes of the user, thus does not result in any coordination problems. This has been experimentally checked.

It has proved to be advantageous to mount the video camera 10 in a position located approximately centrally above the tactile contact surface 6. A realistic perspective for the filmed hand is thus achieved corresponding approximately to the familiar perspective of the human eye during comparable touching actions. Furthermore, neither right-handed nor left-handed people are disadvantaged by this.

For users using the service terminal for the first time, the request can be positioned on the tactile contact surface 6 or alongside it: "Please contact the touch surface and look simultaneously into the searcher screen". All other design tasks relevant to the interaction can be highly flexibly satisfied via the arrangement of the graphic user surface.

What is claimed is:

1. Apparatus for achieving optical data protection and intimacy for users of computer terminals wherein hand movements produced by a user are observed, coordinated and positioned specifically for data input, said apparatus comprising a screen having an acoustic device and an optical system positioned in front of it, a touchscreen surface and a video camera, wherein positioned in front of the optical system there is a searcher screen configured such that the searcher screen communicates in a monocular or binocular manner with the opto-visual sense channels of the user, the searcher screen being further configured such that it is matchable and adjustable to each potential user, wherein the optical system comprises one or a plurality of convex lenses with an installation positioned in front of it having a concavely curved contrast filter sheet with the function of an optical grid or raster, wherein a microphone as well as a loudspeaker are associated with the optical system and take into account the position of mouth and ears of the human head and provide an additional interaction via the acoustic sense channel for interaction via the opto-visual sense channel; wherein a tactile contact surface with associated sensor grid or raster is arranged under the searcher screen and is adjusted or is adjustable to a height suitable for the specific potential user, and wherein a video camera is arranged over the tactile contact surface.

2. Apparatus in accordance with claim 1, wherein the tactile contact surface has dimensions corresponding to those of a conventional touchscreen.

3. Apparatus and method in accordance with claim 1, wherein the signal input is recognized by means of an infrared grid, inductive fields, acoustic coordinates or a grid of mechanical keys.

4. Apparatus and method in accordance with claim 1, wherein the surface of the tactile contact surface does not have to be rigid.

5. Apparatus and method in accordance with claim 1, wherein the operative actions of the user are conveyed to the searcher screen in an abstract or modified form.

6. Apparatus and method in accordance with claim 1, wherein the screen display shows a graphic user interface of moving pictures, real or virtual people, objects or spaces.

7. Apparatus and method in accordance with claim 1, wherein the operative actions of the user are performed by means of a pen.

8. Apparatus and method in accordance with claim 1, wherein the possibility of character and picture recognition exists for the writing which is input by the user.

9. Method for achieving optical data protection and intimacy for users of computer terminals, wherein hand movements produced by a user are observed, coordinated and positioned specifically for data input, wherein finger movements of a potential user taking place on a tactile contact surface are copied by means of a video camera into a virtual image positioned on a searcher screen, wherein the fingers, which are controlled by the user himself, are guided to particular positions of the virtual image, wherein the positions in the virtual image correspond to those on the tactile contact surface where the fingers are currently positioned, and the data input is performed by touching such a position of the tactile contact surface via a sensor grid or raster arranged underneath.

* * * * *